(12) United States Patent
Matsuoka

(10) Patent No.: US 12,117,071 B2
(45) Date of Patent: Oct. 15, 2024

(54) DRIVE UNIT

(71) Applicant: EXEDY Corporation, Neyagawa (JP)

(72) Inventor: Yoshihiro Matsuoka, Neyagawa (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 18/488,385

(22) Filed: Oct. 17, 2023

(65) Prior Publication Data

US 2024/0167551 A1 May 23, 2024

(30) Foreign Application Priority Data

Nov. 17, 2022 (JP) .................. 2022-183883

(51) Int. Cl.
*F16H 47/06* (2006.01)
*B60K 1/00* (2006.01)
*F16H 3/08* (2006.01)
*F16H 3/14* (2006.01)
*F16H 61/18* (2006.01)

(52) U.S. Cl.
CPC .............. *F16H 47/06* (2013.01); *B60K 1/00* (2013.01); *F16H 3/14* (2013.01); *F16H 61/18* (2013.01); *F16H 2003/0822* (2013.01); *F16H 2061/185* (2013.01); *F16H 2200/0021* (2013.01)

(58) Field of Classification Search
CPC .... F16H 47/06; F16H 3/14; F16H 2003/0822; B60K 1/00
USPC ................................................ 74/661, 732.1
See application file for complete search history.

(56) References Cited

U.S. PATENT DOCUMENTS

| 10,744,862 | B2 * | 8/2020 | Sekiguchi | .............. B60K 25/00 |
| 11,131,373 | B2 * | 9/2021 | Matsuoka | ............... F16H 47/08 |
| 11,480,222 | B2 * | 10/2022 | Engerman | ............... F16D 11/14 |
| 11,649,893 | B1 * | 5/2023 | Cattoor | ................... F16H 47/06 |
| | | | | 192/3.28 |
| 11,913,531 | B1 * | 2/2024 | Matsuoka | ............... F16H 47/06 |
| 2023/0135283 | A1 * | 5/2023 | Matsuoka | ............. F16H 63/502 |

FOREIGN PATENT DOCUMENTS

JP       2020172974 A    10/2020

* cited by examiner

*Primary Examiner* — Ha Dinh Ho
(74) *Attorney, Agent, or Firm* — United IP Counselors, LLC

(57) ABSTRACT

Torque is transmitted from an electric motor to an output unit through different gear trains depending on direction of rotation of the electric motor. The drive unit includes an electric motor, a first gear train, a second gear train, a third gear train, and a moving mechanism. The first gear train includes a first drive gear, a first driven gear, and a clutch member. The clutch member moves inside the first driven gear and receives torque transmitted from the first driven gear. The second gear train transmits to an output unit the torque transmitted from the first gear train. The third gear train transmits to the output unit the torque transmitted from the first gear train. The moving mechanism axially moves the clutch member toward the second drive gear when the electric motor is forwardly rotated and toward the third drive gear when the electric motor is reversely rotated.

12 Claims, 5 Drawing Sheets

DRIVE UNIT

CROSS-REFERENCE TO RELATED APPLICATIONS

This application is based on and claims the priority benefit of Japanese application 2022-183883 filed Nov. 17, 2022, the contents of which are incorporated herein by reference.

TECHNICAL FIELD

The claimed invention relates to drive units.

BACKGROUND

There has been proposed a type of drive unit including an electric motor as a drive source (see Japan Laid-open Patent Application Publication No. 2020-172974). The electric motor is capable of outputting a torque not only in forward rotation but also in reverse rotation. A vehicle, in which the drive unit is installed, is moved forward during forward rotation of the electric motor, while being moved rearward during reverse rotation of the electric motor.

It has been required to transmit the torque outputted from the electric motor to an output unit through different gear trains depending on whether the electric motor is forwardly or reversely rotated. In view of the above, it is an object of the claimed invention to provide a drive unit enabled to transmit the torque outputted from the electric motor to the output unit through different gear trains depending on whether the electric motor is forwardly or reversely rotated.

SUMMARY OF THE INVENTION

A drive unit according to a first aspect is configured to drive an output unit. The drive unit includes an electric motor, a first gear train, a second gear train, a third gear train, and a moving mechanism. The electric motor is configured to be forwardly and reversely rotated. The first gear train includes a first drive gear, a first driven gear, and a clutch member. The first drive gear is configured to receive a torque transmitted thereto from the electric motor. The first driven gear is configured to receive the torque transmitted thereto from the first drive gear. The first driven gear has a tubular shape. The clutch member is disposed to be axially movable inside the first driven gear. The clutch member is configured to receive the torque transmitted thereto from the first driven gear. The second gear train includes a second drive gear. The second gear train is configured to transmit to the output unit the torque transmitted thereto from the first gear train. The third gear train includes a third drive gear. The third gear train is configured to transmit to the output unit the torque transmitted thereto from the first gear train. The moving mechanism is configured to axially move the clutch member toward the second drive gear such that the clutch member is engaged with the second drive gear when the electric motor is forwardly rotated. The moving mechanism is configured to axially move the clutch member toward the third drive gear such that the clutch member is engaged with the third drive gear when the electric motor is reversely rotated.

According to this configuration, when the electric motor is forwardly rotated, the moving mechanism moves the clutch member toward the second drive gear. As a result, the clutch member is engaged with the second drive gear; hence, the torque outputted from the first gear train is transmitted to the output unit through the second gear train. On the other hand, when the electric motor is reversely rotated, the moving mechanism moves the clutch member toward the third drive gear. As a result, the clutch member is engaged with the third drive gear; hence, the torque outputted from the first gear train is transmitted to the output unit through the third gear train. Thus, the drive unit according to the first aspect is enabled to transmit the torque outputted from the electric motor to the output unit through different gear trains depending on whether the electric motor is forwardly or reversely rotated.

A drive unit according to a second aspect relates to the drive unit according to the first aspect and is configured as follows. The clutch member is a helical gear. The clutch member is configured to be meshed with a plurality of teeth provided on an inner peripheral surface of the first driven gear.

A drive unit according to a third aspect relates to the drive unit according to the first or second aspect and is configured as follows. The third gear train is greater in reduction ratio than the second gear train.

A drive unit according to a fourth aspect relates to the drive unit according to any of the first to third aspects and is configured as follows. The second gear train includes a support shaft axially extending from the second drive gear. The clutch member is disposed on the support shaft so as to be axially movable and rotatable relative thereto.

A drive unit according to a fifth aspect relates to the drive unit according to the fourth aspect and is configured as follows. The third drive gear is disposed on the support shaft so as to be rotatable relative thereto.

A drive unit according to a sixth aspect relates to the drive unit according to any of the first to fifth aspects and further includes a rotational resistance applying member. The rotational resistance applying member is configured to apply a rotational resistance to the clutch member.

A drive unit according to a seventh aspect relates to the drive unit according to the sixth aspect and is configured as follows. The rotational resistance applying member is disposed between the clutch member and a stopped member when the electric motor is rotated but simultaneously when the output unit is stopped.

A drive unit according to an eighth aspect relates to the drive unit according to the sixth aspect and is configured as follows. The second gear train includes a support shaft axially extending from the second drive gear. The clutch member is disposed on the support shaft so as to be axially movable and rotatable relative thereto. The rotational resistance applying member is disposed between the clutch member and the support shaft.

A drive unit according to a ninth aspect relates to the drive unit according to any of the first to eighth aspects and further includes a restriction mechanism. The restriction mechanism is configured to restrict the clutch member from axially moving.

A drive unit according to a tenth aspect relates to the drive unit according to the ninth aspects and is configured as follows. The restriction mechanism includes a centrifugal member unitarily rotatable with the clutch member. The centrifugal member is configured to be moved radially outward by a centrifugal force generated in rotation of the clutch member so as to be engaged with the first driven gear.

A drive unit according to an eleventh aspect relates to the drive unit according to any of the first to tenth aspects and is configured as follows. The clutch member is configured to establish dog engagement with the second or third drive gear.

A drive unit according to a twelfth aspect relates to the drive unit according to any of the first to eleventh aspects and further includes a torque converter. The torque converter is configured to amplify the torque and transmit the torque amplified thereby to the first gear train when the electric motor is forwardly rotated.

Overall, according to the claimed invention, it is made possible to transmit the torque outputted from the electric motor to the output unit through different gear trains depending on whether the electric motor is forwardly or reversely rotated.

DETAILED DESCRIPTION

A drive unit according to a presently preferred embodiment of the claimed invention will be hereinafter explained with reference to drawings. It should be noted that in the following explanation, unless particularly specified, the term "axial direction" refers to an extending direction of a rotational axis O of a first driven gear 52. On the other hand, the term "circumferential direction" refers to a circumferential direction of an imaginary circle about the rotational axis O, whereas the term "radial direction" refers to a radial direction of the imaginary circle about the rotational axis O.

<Drive Unit>

Figure 1:
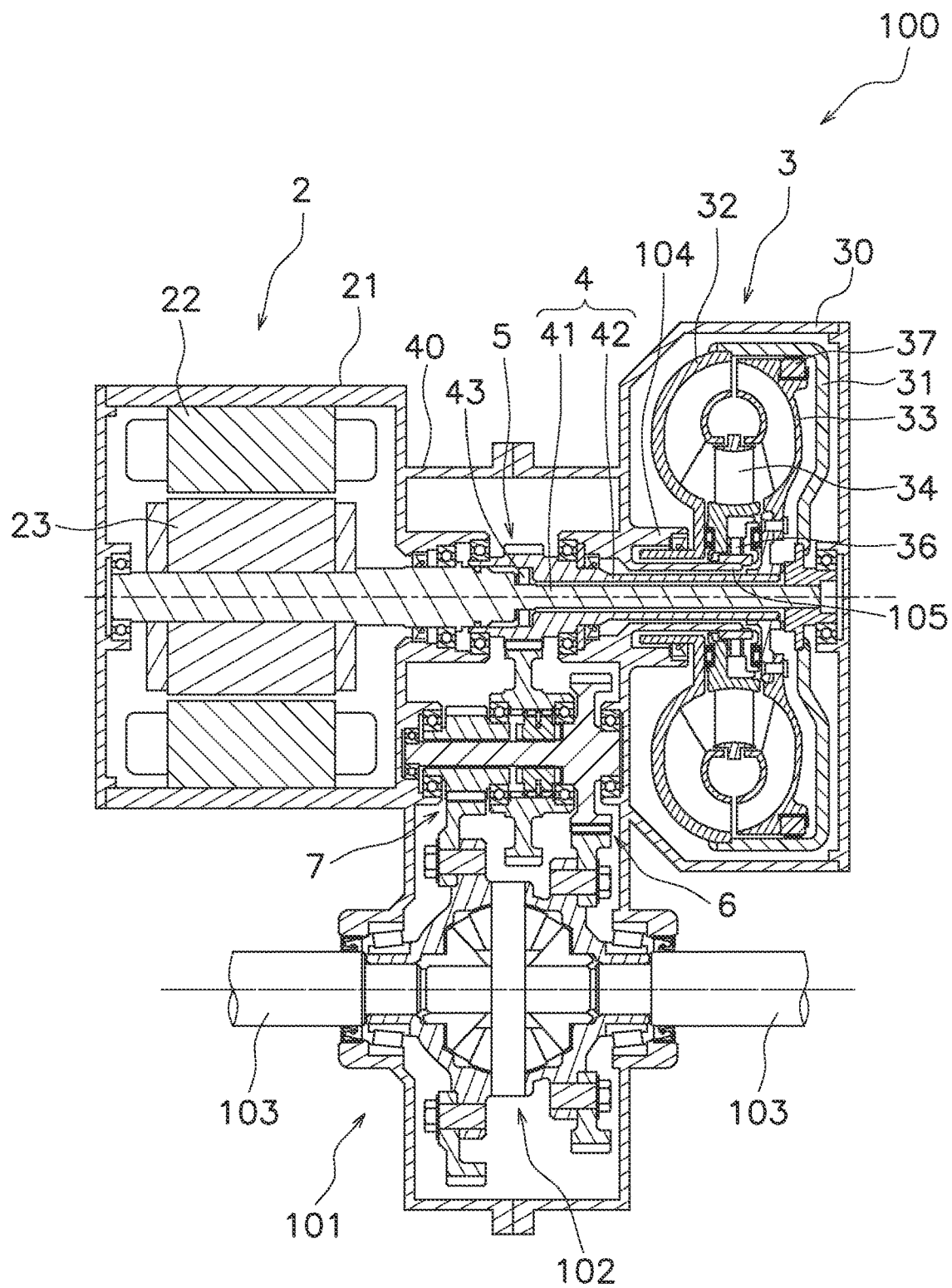
FIG. 1 is a cross-sectional view of a drive unit.
Figure 2:
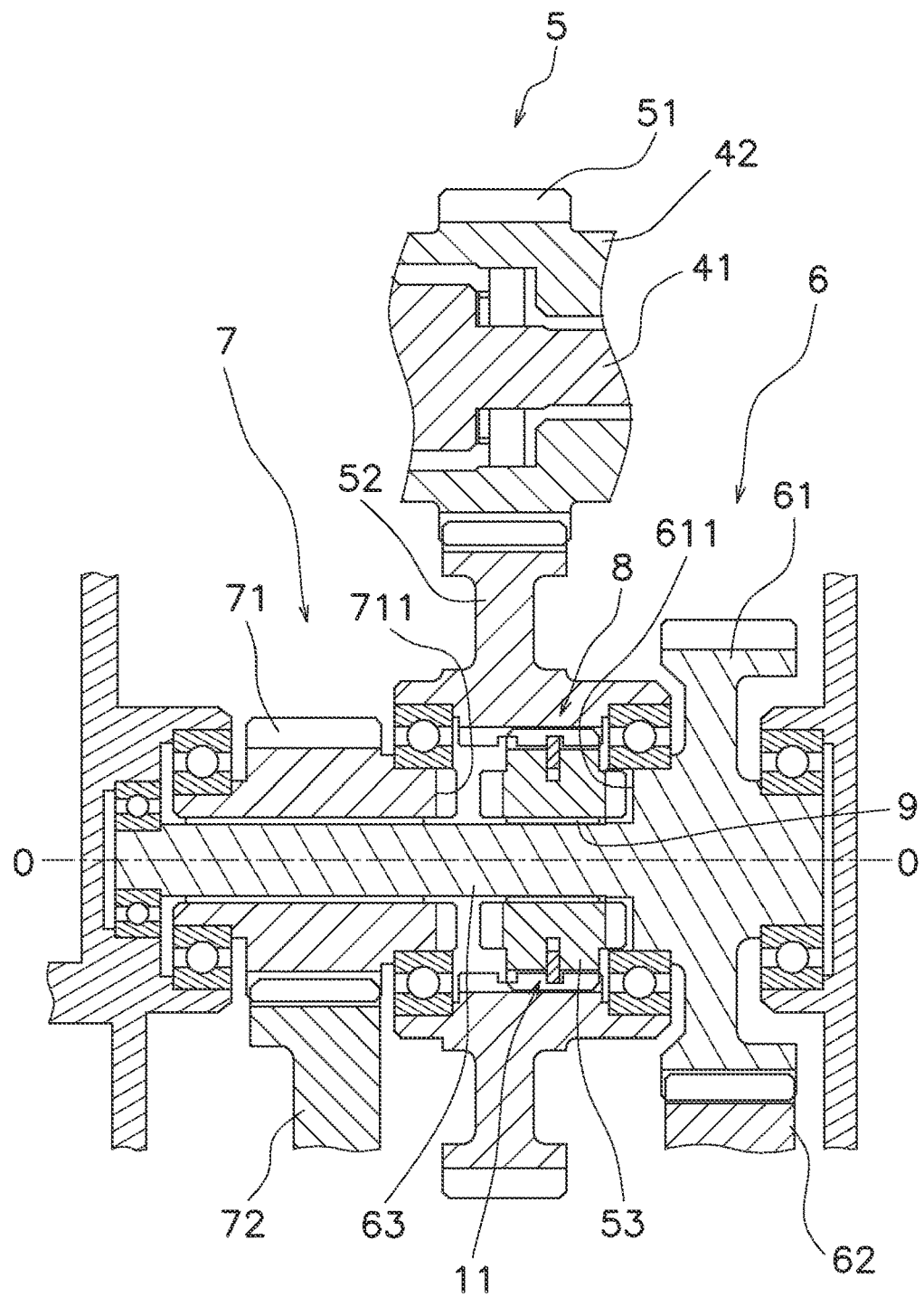
FIG. 2 is an enlarged cross-sectional view of first to third gear trains.

As shown in FIGS. 1 and 2, a drive unit 100 includes an electric motor 2, a torque converter 3, a transmission shaft 4, a first gear train 5, a second gear train 6, a third gear train 7, a moving mechanism 8, a rotational resistance applying member 9, and a restriction mechanism 11. The drive unit 100 is configured to drive an output unit 101. It should be noted that the output unit 101 includes a differential gear 102, a pair of drive shafts 103, and drive wheels (not shown in the drawings). It should be noted that the output unit 101 may include only the drive wheels. The drive unit 100 is installed in, for instance, an electric car.

<Electric Motor>

The electric motor 2 includes a motor casing 21, a motor stator 22, and a rotor 23. The motor casing 21 is non-rotatable, while being fixed to a vehicle body frame or so forth. The motor stator 22 and the rotor 23 are accommodated inside the motor casing 21. The motor stator 22 is fixed to the inner peripheral surface of the motor casing 21. The rotor 23 is disposed radially inside the motor stator 22. In other words, the electric motor 2 is of a so-called inner rotor type. It should be noted that the electric motor 2 may be of an outer rotor type. The electric motor 2 is configured to be rotated not only forwardly but also reversely. When the electric motor 2 is forwardly rotated, a vehicle, in which the drive unit 100 is installed, is moved forward. When the electric motor 2 is reversely rotated, the vehicle is moved rearward.

<Torque Converter>

The torque converter 3 is disposed to be rotatable. The rotational axis of the torque converter 3 is substantially matched with that of the electric motor 2. The torque converter 3 is disposed away from the electric motor 2 at an interval in the extending direction of the rotational axis thereof. The first to third gear trains 5 to 7 are disposed between the torque converter 3 and the electric motor 2. The electric motor 2, the third gear train 7, the first gear train 5, the second gear train 6, and the torque converter 3 are axially aligned in this order. The torque converter 3 is a device to which a torque, outputted from the electric motor 2, is transmitted. The torque converter 3 is configured to amplify the torque and transmit the amplified torque to the first gear train 5 when the electric motor 2 is forwardly rotated.

The torque converter 3 includes a cover 31, an impeller 32, a turbine 33, a stator 34, a first one-way clutch 36, and a centrifugal clutch 37.

The torque converter 3 is configured such that the impeller 32 is disposed on the electric motor 2 side (the left side in FIG. 1), whereas the cover 31 is disposed on the opposite side of the electric motor 2 (the right side in FIG. 1). The torque converter 3 is accommodated inside the torque converter casing 30. Hydraulic fluid is supplied into the torque converter 3. The hydraulic fluid may, for instance, be hydraulic oil.

The cover 31 is a component to which the torque, transmitted from the electric motor 2, is inputted. The cover 31 is fixed to a first transmission shaft 41. The cover 31 is unitarily rotated with the first transmission shaft 41. The cover 31 is disposed to cover the turbine 33.

The impeller 32 is unitarily rotated with the cover 31. The impeller 32 is rotatably supported by a first stationary shaft 104 through a bearing member. The first stationary shaft 104 is non-rotatable.

The turbine 33 is disposed in opposition to the impeller 32. Specifically, the turbine 33 is axially opposed to the impeller 32. The turbine 33 is a component to which the torque is transmitted from the impeller 32 through the hydraulic fluid.

A second transmission shaft 42 is attached to the turbine 33. Specifically, the second transmission shaft 42 is spline-coupled to the turbine 33. The turbine 33 is unitarily rotated with the second transmission shaft 42.

The stator 34 is configured to regulate the flow of the hydraulic oil returning from the turbine 33 to the impeller 32. The stator 34 is supported by a second stationary shaft 105 through the first one-way clutch 36. The stator 34 is disposed axially between the impeller 32 and the turbine 33.

The first one-way clutch 36 is disposed between the second stationary shaft 105 and the stator 34. The first one-way clutch 36 is configured to make the stator 34 forwardly rotatable. On the other hand, the first one-way clutch 36 makes the stator 34 reversely non-rotatable. The torque is transmitted from the impeller 32 to the turbine 33, while being amplified by the stator 34.

The centrifugal clutch 37 is attached to either the turbine 33 or the second transmission shaft 42. The centrifugal clutch 37 is unitarily rotated with the turbine 33. The centrifugal clutch 37 is configured to couple the cover 31 and the turbine 33 to each other by a centrifugal force generated in rotation of the turbine 33. Specifically, the centrifugal clutch 37 is configured to transmit the torque from the cover 31 to the turbine 33 when the rotational speed of the turbine 33 becomes greater than or equal to a predetermined value.

<Transmission Shaft>

The transmission shaft 4 is configured to transmit the torque between the electric motor 2 and the first gear train 5. The transmission shaft 4 includes the first and second transmission shafts 41 and 42.

The first transmission shaft 41 extends from the electric motor 2 toward the torque converter 3. Specifically, the first transmission shaft 41 extends from the rotor 23 of the electric motor 2. The first transmission shaft 41 is disposed to be rotatable. The rotational axis of the first transmission shaft 41 is substantially matched with that of the electric motor 2 and that of the torque converter 3.

The first transmission shaft 41 is configured to transmit the torque between the electric motor 2 and the torque converter 3. The first transmission shaft 41 is connected to the impeller 32 of the torque converter 3. Specifically, the first transmission shaft 41 is connected to the impeller 32 through the cover 31. The first transmission shaft 41 is attached at the distal end thereof to the cover 31 of the torque converter 3.

The second transmission shaft 42 transmits the torque between the torque converter 3 and the first gear train 5. The second transmission shaft 42 extends from the torque converter 3 toward the electric motor 2. The second transmission shaft 42 is disposed to be rotatable. The rotational axis of the second transmission shaft 42 is substantially matched with that of the electric motor 2 and that of the torque converter 3. Besides, the rotational axis of the second transmission shaft 42 is substantially matched with that of the first transmission shaft 41 as well.

The second transmission shaft 42 has a cylindrical shape. The first transmission shaft 41 extends through the interior of the second transmission shaft 42. It should be noted that the first transmission shaft 41 is solid. The second transmission shaft 42 is attached at one end thereof (the right end in FIG. 1) to the turbine 33 of the torque converter 3. The second transmission shaft 42 is disposed to be rotatable. For example, the second transmission shaft 42 is rotatably supported by a casing 40 or so forth through a bearing member and/or so forth.

A second one-way clutch 43 is disposed between the first and second transmission shafts 41 and 42. When the first transmission shaft 41 transmits the torque generated in forward rotation of the electric motor 2, the second one-way clutch 43 idles. In other words, in forward movement of the vehicle, the second one-way clutch 43 does not transmit the torque from the first transmission shaft 41 to the second transmission shaft 42. On the other hand, when the first transmission shaft 41 transmits the torque generated in reverse rotation of the electric motor 2, the second one-way clutch 43 transmits the torque. In other words, in rearward movement of the vehicle, the second one-way clutch 43 transmits the torque from the first transmission shaft 41 to the second transmission shaft 42.

<First Gear Train>

As shown in FIG. 2, the first gear train 5 includes a first drive gear 51, the first driven gear 52, and a clutch member 53. The first drive gear 51 is configured to receive the torque transmitted thereto from the electric motor 2. The first drive gear 51 is unitarily rotated with the second transmission shaft 42. Specifically, the first drive gear 51 is integrated with the second transmission shaft 42 as a single member.

The first driven gear 52 is disposed to be rotatable about the rotational axis O. The first driven gear 52 is axially immovable. Specifically, the first driven gear 52 is supported by the casing 40 through a plurality of bearing members, a second drive gear 61, and a third drive gear 71. Because of this, the first driven gear 52 is axially immovable.

The first driven gear 52 is configured to receive the torque transmitted thereto from the first drive gear 51. The first driven gear 52 has a cylindrical shape. The first driven gear 52 is provided with a plurality of teeth on each of the outer and inner peripheral surfaces thereof. The first driven gear 52 is meshed with the first drive gear 51 through the respective teeth provided on the outer peripheral surface thereof. The respective teeth, provided on the inner peripheral surface of the first driven gear 52, comprise a helical gear. In other words, the first driven gear 52 is an internal helical gear.

The clutch member 53 is disposed inside the first driven gear 52. The clutch member 53 is configured to receive the torque transmitted thereto from the first driven gear 52. The clutch member 53 is disposed to be rotatable about the rotational axis O. The clutch member 53 is unitarily rotated with the first driven gear 52.

The clutch member 53 is disposed to be axially movable. The clutch member 53 has a cylindrical shape. The clutch member 53 is provided with a plurality of teeth on the outer peripheral surface thereof. The respective teeth, provided on the outer peripheral surface of the clutch member 53, are meshed with those provided on the inner peripheral surface of the first driven gear 52. The clutch member 53 is a helical gear configured to be meshed with the respective teeth provided on the inner peripheral surface of the first driven gear 52.

Figure 3:
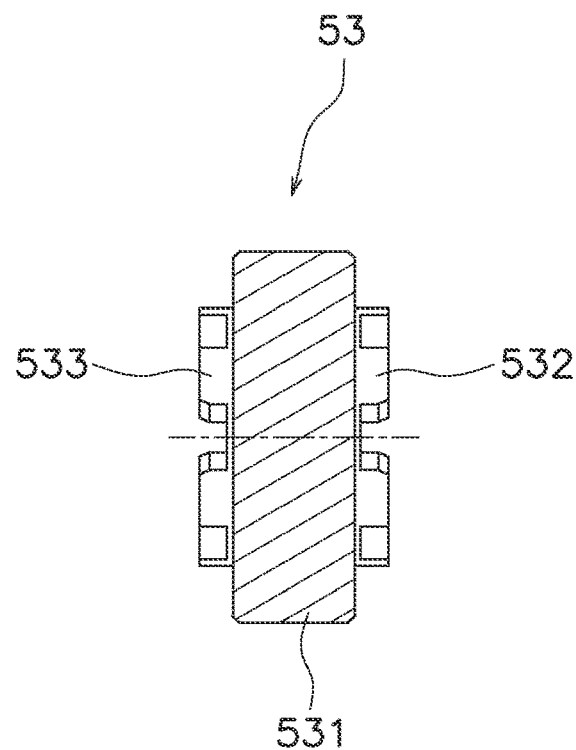
FIG. 3 is a front view of a clutch member.
Figure 4:
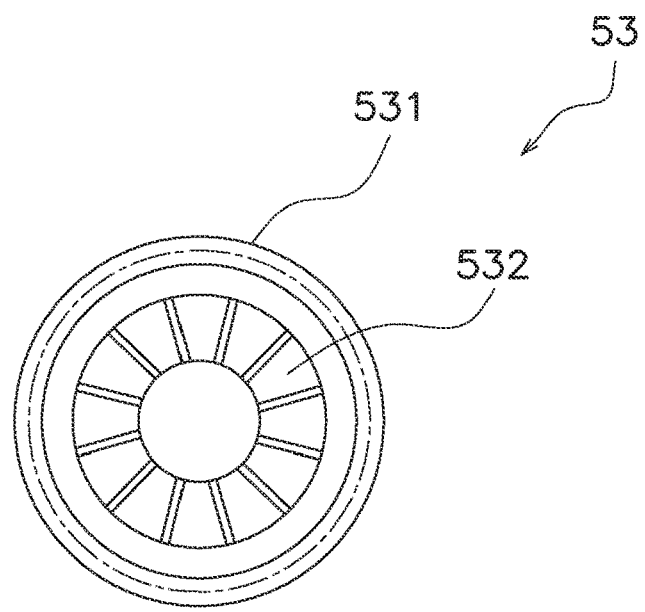
FIG. 4 is a side view of the clutch member.

FIG. 3 is a front view of the clutch member 53. In other words, FIG. 3 is a view of the clutch member 53 seen along a direction orthogonal to the rotational axis O. FIG. 4 is a side view of the clutch member 53. In other words, FIG. 4 is a view of the clutch member 53 seen along the axial direction.

As shown in FIGS. 3 and 4, the clutch member 53 includes a body 531, a plurality of first fitting protrusions 532, and a plurality of second fitting protrusions 533. The body 531 has a cylindrical shape and is provided with a plurality of teeth on the outer peripheral surface thereof.

The first fitting protrusions 532 axially protrude from the body 531. Specifically, the first fitting protrusions 532 protrude from the body 531 toward the second gear train 6. The first fitting protrusions 532 are disposed circumferentially away from each other at intervals.

The second fitting protrusions 533 axially protrude from the body 531. Specifically, the second fitting protrusions 533 protrude from the body 531 toward the third gear train 7. In other words, the second fitting protrusions 533 protrude to the opposite side of the first fitting protrusions 532. The second fitting protrusions 533 are disposed circumferentially away from each other at intervals.

<Second Gear Train>

As shown in FIG. 2, the second gear train 6 is disposed axially in adjacent to the first gear train 5. The second gear train 6 is configured to transmit the torque, inputted thereto from the first gear train 5, to the output unit 101. The second gear train 6 is configured to transmit the torque generated in forward rotation of the electric motor 2. The second gear train 6 includes the second drive gear 61, a second driven gear 62, and a support shaft 63.

The second drive gear 61 is rotatably supported by the casing 40 or so forth through a plurality of bearing members. The second drive gear 61 is axially immovable. The second drive gear 61 is disposed to be rotatable about the rotational axis O. The second drive gear 61 is disposed axially in adjacent to the clutch member 53.

The second drive gear 61 is provided with a plurality of first fitting recesses 611 on a surface thereof facing the clutch member 53. The plural first fitting recesses 611 are disposed circumferentially away from each other at intervals. The plural first fitting recesses 611 correspond to the plural the first fitting protrusions 532, respectively. When the plural first fitting protrusions 532 and the plural first fitting recesses 611 are fitted to each other, the clutch member 53 establishes dog engagement with the second drive gear 61 of the second gear train 6. As a result, the clutch member 53 and the second drive gear 61 are unitarily rotated, whereby the torque outputted from the first gear train 5 is transmitted to the output unit 101 through the second gear train 6.

The support shaft 63 axially extends from the second drive gear 61. The support shaft 63 extends from the second drive gear 61 toward the third drive gear 71. The support shaft 63 is unitarily rotated with the second drive gear 61. The second drive gear 61 and the support shaft 63 are integrated with each other as a single member.

The clutch member 53 is supported by the support shaft 63. Specifically, the clutch member 53 is axially penetrated by the support shaft 63. The clutch member 53 is rotatable relative to the support shaft 63. Besides, the clutch member 53 is axially movable on the support shaft 63.

The second driven gear 62 is configured to receive the torque transmitted thereto from the second drive gear 61. Specifically, the second driven gear 62 is meshed with the second drive gear 61. The second driven gear 62 transmits the torque to the output unit 101.

<Third Gear Train>

The third gear train 7 is disposed axially in adjacent to the first gear train 5. The third gear train 7 is disposed axially on the opposite side of the second gear train 6 with reference to the first gear train 5. In other words, the first gear train 5 is disposed axially between the second and third gear trains 6 and 7.

The third gear train 7 is configured to transmit the torque, inputted thereto from the first gear train 5, to the output unit 101. The torque outputted from the first gear train 5 is transmitted to the output unit 101 through either the second gear train 6 or the third gear train 7. The third gear train 7 is configured to transmit the torque generated in reverse rotation of the electric motor 2. The third gear train 7 is greater in reduction ratio than the second gear train 6.

The third gear train 7 includes the third drive gear 71 and a third driven gear 72. The third drive gear 71 is supported on the support shaft 63 so as to be rotatable relative thereto. Specifically, the support shaft 63 axially penetrates the third drive gear 71. Besides, the third drive gear 71 is rotatably supported by the casing 40 or so forth through a plurality of bearing members.

The third drive gear 71 is disposed to be rotatable about the rotational axis O. The third drive gear 71 is disposed axially in adjacent to the clutch member 53. The third drive gear 71 is disposed axially on the opposite side of the second drive gear 61 with reference to the clutch member 53. In other words, the clutch member 53 is disposed axially between the second and third drive gears 61 and 71. The third drive gear 71 is axially immovable. The third drive gear 71 is smaller in diameter and lesser in number of teeth than the second drive gear 61.

The third drive gear 71 is provided with a plurality of second fitting recesses 711 on a surface thereof facing the clutch member 53. The plural second fitting recesses 711 are disposed circumferentially away from each other at intervals. The plural second fitting recesses 711 correspond to the plural second fitting protrusions 533, respectively. When the plural second fitting protrusions 533 and the plural second fitting recesses 711 are fitted to each other, the clutch member 53 establishes dog engagement with the third drive gear 71. As a result, the clutch member 53 and the third drive gear 71 are unitarily rotated, whereby the torque outputted from the first gear train 5 is transmitted to the output unit 101 through the third gear train 7.

The third driven gear 72 is configured to receive the torque transmitted thereto from the third drive gear 71. Specifically, the third driven gear 72 is meshed with the third drive gear 71. The third driven gear 72 transmits the torque to the output unit 101.

<Moving Mechanism>

The moving mechanism 8 is configured to axially move the clutch member 53. When the electric motor 2 is forwardly rotated, the moving mechanism 8 axially moves the clutch member 53 toward the second drive gear 61. Accordingly, the clutch member 53 is engaged with the second drive gear 61 and is thus unitarily rotated therewith. Specifically, the first fitting protrusions 532 of the clutch member 53 are fitted to the first fitting recesses 611 of the second drive gear 61. In other words, the clutch member 53 establishes dog engagement with the second drive gear 61.

When the electric motor 2 is reversely rotated, the moving mechanism 8 axially moves the clutch member 53 toward the third drive gear 71. Accordingly, the clutch member 53 is engaged with the third drive gear 71 and is thus unitarily rotated therewith. Specifically, the second fitting protrusions 533 of the clutch member 53 are fitted to the second fitting recesses 711 of the third drive gear 71. In other words, the clutch member 53 establishes dog engagement with the third drive gear 71.

The moving mechanism 8 is comprised of the plural teeth provided on the inner peripheral surface of the first driven gear 52 and those provided on the outer peripheral surface of the clutch member 53. It should be noted that the respective teeth, provided on the inner peripheral surface of the first driven gear 52, comprise the internal helical gear. Besides, the respective teeth, provided on the outer peripheral surface of the clutch member 53, comprise the helical gear as well. In other words, the moving mechanism 8 is comprised of the internal helical gear provided on the inner peripheral surface of the first driven gear 52 and the helical gear provided on the outer peripheral surface of the clutch member 53.

A thrust acts on the clutch member 53 in transmission of torque from the respective teeth provided on the inner peripheral surface of the first driven gear 52 to those provided on the clutch member 53. When the electric motor 2 is forwardly rotated, a thrust directed toward the second drive gear 61 acts on the clutch member 53. As a result, the clutch member 53 is axially moved toward the second drive gear 61 (i.e., rightward in FIG. 2), establishes dog engagement with the second drive gear 61, and is unitarily rotated therewith. Accordingly, the torque outputted from the first gear train 5 is transmitted to the output unit 101 through the second gear train 6.

On the other hand, when the electric motor 2 is reversely rotated, a thrust directed toward the third drive gear 71 acts on the clutch member 53. As a result, the clutch member 53 is axially moved toward the third drive gear 71 (i.e., leftward in FIG. 2), establishes dog engagement with the third drive gear 71, and is unitarily rotated therewith. Accordingly, the torque outputted from the first gear train 5 is transmitted to the output unit 101 through the third gear train 7.

<Rotational Resistance Applying Member>

The rotational resistance applying member 9 is configured to apply rotational resistance to the clutch member 53. The rotational resistance applying member 9 is disposed between the clutch member 53 and the support shaft 63. For example, the rotational resistance applying member 9 is attached to the inner peripheral surface of the clutch member 53. When the clutch member 53 is rotated relative to the support shaft 63, the rotational resistance applying member 9 applies rotational resistance to the clutch member 53; as a result, it is made possible to reliably apply a thrust to the clutch member 53. The rotational resistance applying member 9 is made of a material higher in friction coefficient than the clutch member 53. For example, the rotational resistance applying member 9 is made of a resin, friction material, plate spring, or so forth.

<Restriction Mechanism>

Figure 5:
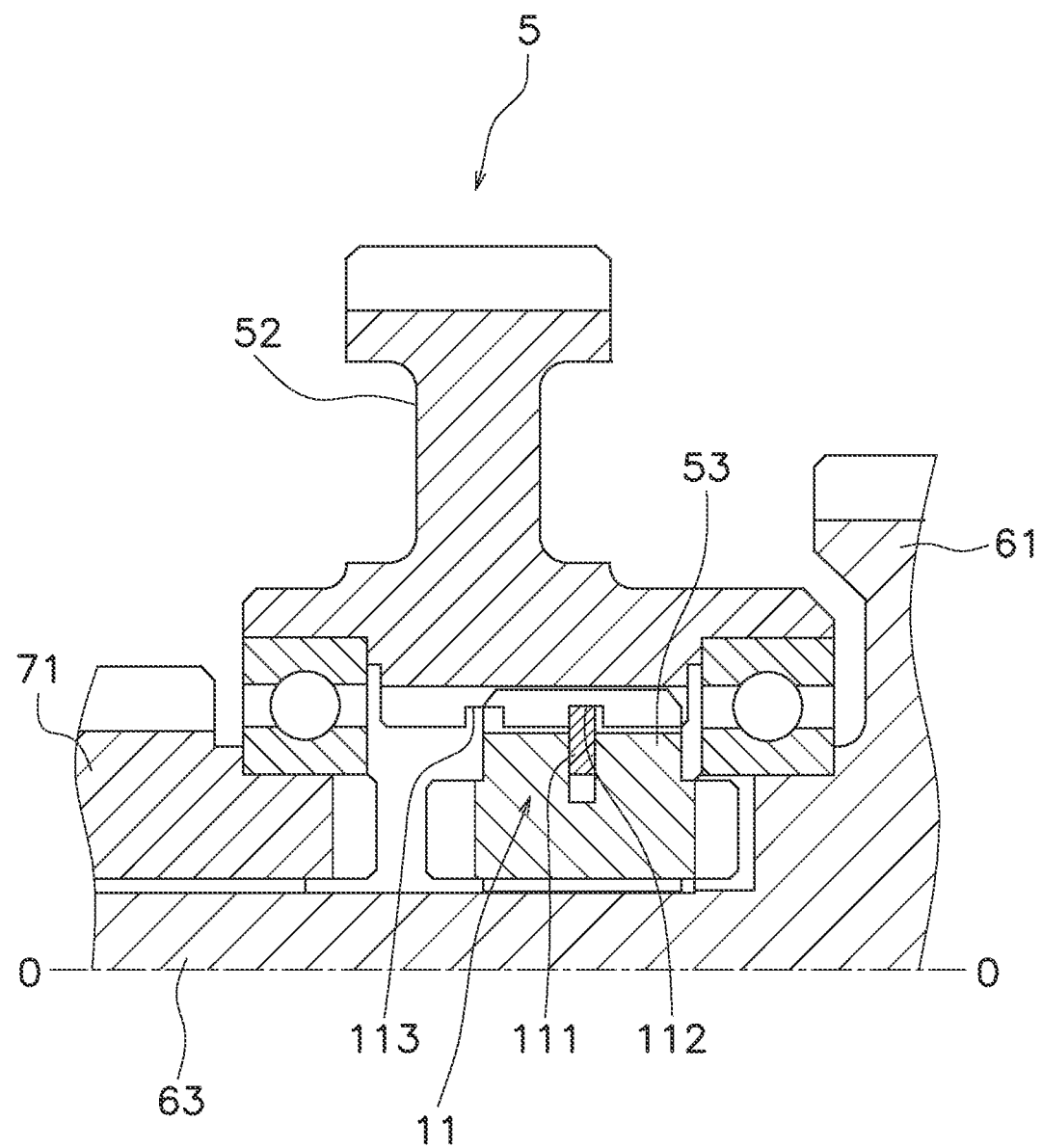
FIG. 5 is an enlarged cross-sectional view of the clutch member and the surroundings thereof.

As shown in FIG. 5, the restriction mechanism 11 is configured to restrict the clutch member 53 from axially moving. The restriction mechanism 11 includes a centrifugal member 111. Besides, the restriction mechanism 11 includes a first engaging recess 112 and a second engaging recess 113, both of which are provided on the inner peripheral surface of the first driven gear 52.

The first and second engaging recesses 112 and 113 are disposed axially away from each other at an interval. The first engaging recess 112 is provided to be located radially in opposition to the centrifugal member 111 when the clutch member 53 is engaged with the second drive gear 61. The second engaging recess 113 is provided to be located radially in opposition to the centrifugal member 111 when the clutch member 53 is engaged with the third drive gear 71.

The centrifugal member 111 is attached to the clutch member 53. The centrifugal member 111 is unitarily rotatable with the clutch member 53. The centrifugal member 111 is moved radially outward by a centrifugal force generated in rotation of the clutch member 53.

When moved radially outward, the centrifugal member 111 is engaged with the first driven gear 52. Accordingly, the clutch member 53 is restricted from axially moving. Specifically, the centrifugal member 111 is engaged with the first engaging recess 112 in rotation of the clutch member 53 engaged with the second drive gear 61. As a result, even when a thrust directed to separate from the second drive gear 61 acts on the clutch member 53 due to deceleration or so forth, it is made possible to keep the condition that the clutch member 53 is engaged with the second drive gear 61. On the other hand, the centrifugal member 111 is engaged with the second engaging recess 113 in rotation of the clutch member 53 engaged with the third drive gear 71. As a result, even when a thrust directed to separate from the third drive gear 71 acts on the clutch member 53 due to deceleration or so forth, it is made possible to keep the condition that the clutch member 53 is engaged with the third drive gear 71.

[Modifications]

One preferred embodiment of the claimed invention has been explained above. However, the claimed invention is not limited to the above, and a variety of changes can be made without departing from the gist of the claimed invention. It should be noted that basically speaking, respective modifications to be described are applicable simultaneously.

Figure 6:
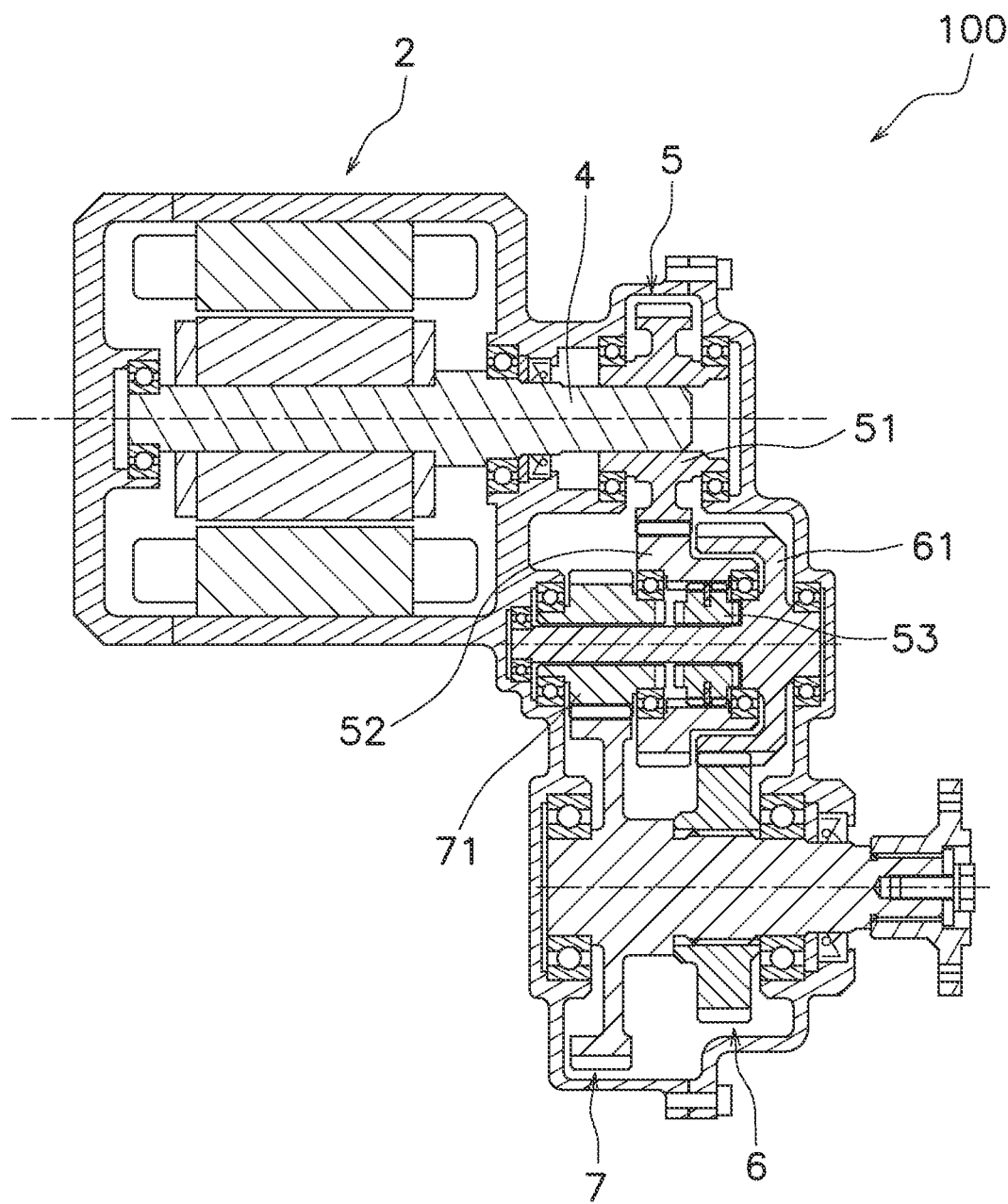
FIG. 6 is a cross-sectional view of a drive unit according to a modification.

(a) In the preferred embodiment described above, the drive unit 100 includes the torque converter 3; however, the drive unit 100 is not limited in configuration to this. For example, as shown in FIG. 6, the drive unit 100 may not include any torque converter. In this case, the transmission shaft 4 directly transmits the torque from the electric motor 2 to the first gear train 5. It should be noted that the transmission shaft 4 directly transmits the torque from the electric motor 2 to the first gear train 5 regardless of whether the electric motor 2 is forwardly or reversely rotated.

(b) In the preferred embodiment described above, the moving mechanism 8 is comprised of the helical gear provided on the inner peripheral surface of the first driven gear 52 and that provided on the outer peripheral surface of the clutch member 53; however, the moving mechanism 8 is not limited in configuration to this. For example, the moving mechanism 8 may be configured to axially move the clutch member 53 by hydraulic pressure or so forth. In this case, not the helical gear but a spur gear may be provided on each of the inner peripheral surface of the first driven gear 52 and the outer peripheral surface of the clutch member 53.

(c) In the preferred embodiment described above, the rotational resistance applying member 9 is attached to the inner peripheral surface of the clutch member 53; alternatively, the rotational resistance applying member 9 may be attached to the outer peripheral surface of the support shaft 63. In this case, the rotational resistance applying member 9 is made of a material higher in friction coefficient than the support shaft 63.

Besides, the rotational resistance applying member 9 is disposed between the clutch member 53 and the support shaft 63; however, the rotational resistance applying member 9 may be disposed in any other position as long as being disposed between the clutch member 53 and a stopped member. It should be noted that the term "stopped member" refers to a member stopped when the electric motor 2 is rotated but simultaneously the output unit 101 is stopped. It should be noted that the support shaft 63 is also exemplified as the stopped member. Other than this, such a component as the second drive gear 61 or the third drive gear 71 is exemplified as the stopped member. It should be noted that the drive unit 100 may not include the rotational resistance applying member 9.

(d) In the preferred embodiment described above, the restriction mechanism 11 includes the centrifugal member 111; however, the restriction mechanism 11 is not limited in configuration to this. For example, the restriction mechanism 11 may include, instead of the centrifugal member 111, a restriction member operated by, for instance, hydraulic pressure or an actuator. The restriction member is attached to the clutch member 53 in similar manner to the centrifugal member 111 and is enabled to be engaged with each of the first and second engaging recesses 112 and 113. The centrifugal member 111 is moved radially outward by the centrifugal force; by contrast, the restriction member is radially moved by the hydraulic pressure or the actuator.

(e) In the preferred embodiment described above, the support shaft 63 axially extends from the second drive gear 61; however, the support shaft 63 is not limited in configuration to this. For example, the support shaft 63 may extend from the third drive gear 71 toward the second drive gear 61. Besides, the clutch member 53 and the second drive gear 61 may be supported by the support shaft 63 so as to be rotatable relative thereto.

LIST OF REFERENCE NUMERALS

2: Electric motor, 3: Torque converter, 5: First gear train, 51: First drive gear, 52: First driven gear, 53: Clutch member, 6: Second gear train, 61: Second drive gear, 63: Support shaft, 7: Third gear train, 71: Third drive gear, 8: Moving mechanism, 9: Rotational resistance applying member, 11: Restriction mechanism, 111: Centrifugal member, 100: Drive unit, 101: Output unit

I claim:

1. A drive unit configured to drive an output unit, the drive unit comprising:
an electric motor configured to be forwardly and reversely rotated;

a first gear train including a first drive gear, a first driven gear, and a clutch member, the first drive gear configured to receive a torque transmitted thereto from the electric motor, the first driven gear having a tubular shape, the first driven gear configured to receive the torque transmitted thereto from the first drive gear, the clutch member disposed to be axially movable inside the first driven gear, the clutch member configured to receive the torque transmitted thereto from the first driven gear;

a second gear train including a second drive gear, the second gear train configured to transmit to the output unit the torque transmitted thereto from the first gear train;

a third gear train including a third drive gear, the third gear train configured to transmit to the output unit the torque transmitted thereto from the first gear train; and a moving mechanism configured to axially move the clutch member toward the second drive gear such that the clutch member is engaged with the second drive gear when the electric motor is forwardly rotated, the moving mechanism being configured to axially move the clutch member toward the third drive gear such that the clutch member is engaged with the third drive gear when the electric motor is reversely rotated.

2. The drive unit according to claim 1, wherein the clutch member is a helical gear configured to be meshed with a plurality of teeth provided on an inner peripheral surface of the first driven gear.

3. The drive unit according to claim 1, wherein the third gear train is greater in reduction ratio than the second gear train.

4. The drive unit according to claim 1, wherein
the second gear train includes a support shaft axially extending from the second drive gear, and
the clutch member is disposed on the support shaft so as to be axially movable and rotatable relative thereto.

5. The drive unit according to claim 4, wherein the third drive gear is disposed on the support shaft so as to be rotatable relative thereto.

6. The drive unit according to claim 1, further comprising:
a rotational resistance applying member configured to apply a rotational resistance to the clutch member.

7. The drive unit according to claim 6, wherein the rotational resistance applying member is disposed between the clutch member and a stopped member when the electric motor is rotated but simultaneously when the output unit is stopped.

8. The drive unit according to claim 6, wherein
the second gear train includes a support shaft axially extending from the second drive gear,
the clutch member is disposed on the support shaft so as to be axially movable and rotatable relative thereto, and
the rotational resistance applying member is disposed between the clutch member and the support shaft.

9. The drive unit according to claim 1, further comprising:
a restriction mechanism configured to restrict the clutch member from axially moving.

10. The drive unit according to claim 9, wherein
the restriction mechanism includes a centrifugal member unitarily rotatable with the clutch member, and
the centrifugal member is configured to be moved radially outward by a centrifugal force generated in rotation of the clutch member so as to be engaged with the first driven gear.

11. The drive unit according to claim 1, wherein the clutch member is configured to establish dog engagement with the second or third drive gear.

12. The drive unit according to claim 1, further comprising:
a torque converter configured to amplify the torque and transmit the torque amplified thereby to the first gear train when the electric motor is forwardly rotated.

* * * * *